United States Patent [19]

Chaborski

[11] 4,297,030

[45] Oct. 27, 1981

[54] METHOD AND APPARATUS FOR MEASURING THE DISTANCE AND/OR RELATIVE ELEVATION BETWEEN TWO POINTS

[75] Inventor: Hoiko Chaborski, Ottobrunn, Fed. Rep. of Germany

[73] Assignee: MITEC-Moderne-Industrietechnik GmbH, Ottobrunn, Fed. Rep. of Germany

[21] Appl. No.: 44,344

[22] Filed: May 31, 1979

Related U.S. Application Data

[63] Continuation-in-part of Ser. No. 926,099, Jul. 19, 1978, abandoned, which is a continuation of Ser. No. 743,801, Nov. 22, 1976, abandoned.

[30] Foreign Application Priority Data

Nov. 28, 1975 [DE] Fed. Rep. of Germany ....... 2553591

[51] Int. Cl.$^3$ .............................................. G01C 3/08
[52] U.S. Cl. .......................................... 356/5; 356/4
[58] Field of Search ....................................... 356/4, 5

[56] References Cited

U.S. PATENT DOCUMENTS

| | | | |
|---|---|---|---|
| 3,619,058 | 11/1971 | Hewlett et al. | 356/5 |
| 3,652,161 | 3/1972 | Ross | 356/5 |
| 3,690,767 | 9/1972 | Missio et al. | 356/5 |
| 3,728,025 | 4/1973 | Madigan et al. | 356/5 |
| 3,765,768 | 10/1973 | Budin et al. | 356/5 |
| 3,778,160 | 12/1973 | Wolcott | 356/5 |
| 3,900,260 | 8/1975 | Wendt | 356/5 |

Primary Examiner—S. C. Buczinski
Attorney, Agent, or Firm—W. G. Fasse; D. F. Gould

[57] ABSTRACT

The distance between a target and a measuring point is measured by optical and electronic elements forming an opto-electronic circuit arrangement wherein a light beam is modulated by a first frequency signal. The light beam is divided to produce a measuring beam and a reference beam. The measuring beam as reflected from the target and the reference beam are supplied through a single light scanner to a light sensitive detector in accordance with a predetermined scanning or sequencing function. The output signal of the detector and a second frequency signal are supplied to a mixing stage to form an intermediate frequency signal. A digital counter receives a start counting signal coinciding with the receipt of the the reference beam and a stop counting signal coinciding with the return of the reflected beam. The digital counter is operated as a dynamic memory because in the present system the phase which exists at the instant of switching the scanner to receiving the reference beam, is continuously repeated whereby a true single channel system is accomplished. A second counter counts pulses within the time raster established by the dynamic memory counter.

8 Claims, 7 Drawing Figures

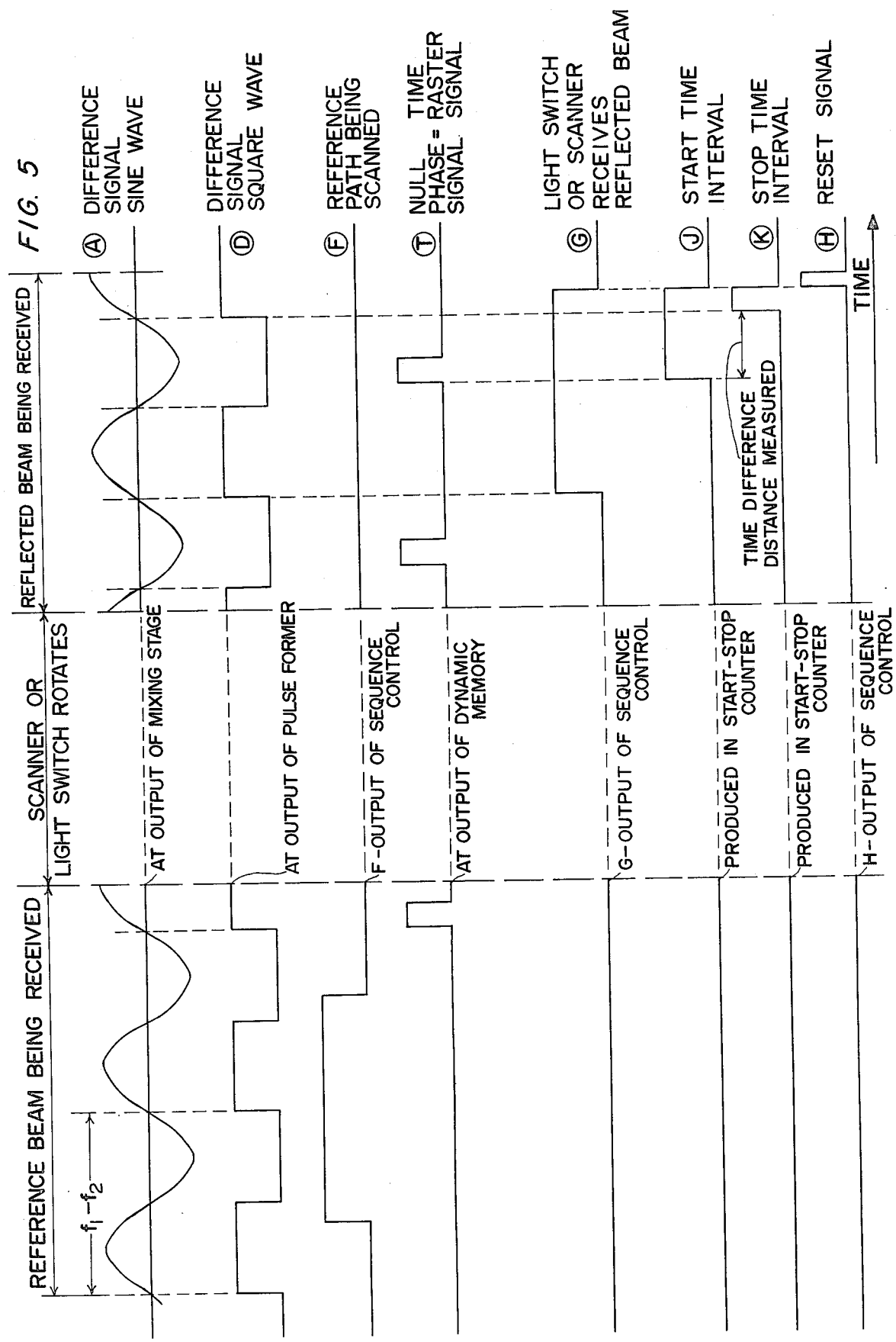

METHOD AND APPARATUS FOR MEASURING THE DISTANCE AND/OR RELATIVE ELEVATION BETWEEN TWO POINTS

CROSS REFERENCE TO RELATED APPLICATIONS

The present application is a continuation-in-part application of my copending application Ser. No. 926,099 filed on July 19, 1978, which is a continuation of Ser. No. 743,801, filed on Nov. 22, 1976, now both abandoned.

BACKGROUND OF THE INVENTION

The present invention relates to a method and apparatus for measuring the distance and/or relative elevation between two points by opto-electronic means. The present apparatus achieves high precision measurements, whereby the topography itself is the only limitation for the distance that may be measured.

U.S. Pat. No. 3,900,260 describes a method and apparatus for measuring the distance and/or a relative elevation between two points, wherein a light source, which may be externally modulated, provides a modulated light beam. The modulated light beam is split into a measuring beam which is reflected by the target and into a reference beam. Both beams are alternately scanned and alternately supplied to a detector by means of an optical light switch such as an electronically controlled galvanometer. The switching or scanning function is subject to a predetermined control function which may be provided by a memory. The output of the light scanner is supplied to a detector and the output of the detector in turn is supplied as one input to a mixing stage which also receives a further frequency signal having a frequency which differs from that of the modulated light beam. The frequency difference is a predetermined value.

In U.S. Pat. No. 3,900,260 a third frequency is produced by a third oscillator, the output of which is supplied to a second mixing stage which also receives the first frequency signal. The third frequency differs from the first and second frequency by a predetermined value. Thus, in the reference two separate frequency channels are established and the difference frequency between the two channels is supplied either to a differentiating circuit or to a logic signal combining circuit to detect the spacing between two pulse flanks defining a time difference which is thus derived from the two frequency channels. The result of this differentiation or signal combination is supplied to a signal evaluation computer which provides a direct display of the measured distance. The operation is such that transit times and transit time variations inherent in the apparatus are eliminated exactly during the measuring which is accomplished on the basis of the precise frequencies of the two frequency channels.

Further, in U.S. Pat. No. 3,900,260 two distances are measured from a measuring point to two points, one of which is arranged vertically above the other with a given spacing. The light beam is reflected from these two points to a target by retroreflectors, whereby the known apparatus is capable of automatically providing a measure for the elevation as well as for the distance along a base line between the measuring point and the target.

U.S. Pat. No. 3,652,161 discloses a method and arrangement for optically measuring distances with high precision by detecting the time of travel of a pulse whereby two separate channels are employed requiring two separate light detectors. One channel processes the reference beam and the other channel continuously processes the reflecting beam. In U.S. Pat. No. 3,642,161 (Ross) a coarse measurement is made by measuring the transit time of a single impulse. A second measurement employs a higher frequency signal and a phase difference between the reference signal and the reflected signal is measured, whereby an ambiguity in the number of wave lengths between the direct and reflected wave is resolved by the coarse measurement.

U.S. Pat. No. 3,765,768 measures the distance and radial speed of a moving object by making use of the so-called "Doppler" frequency of the reflected pulse.

The use of two different channels as in U.S. Pat. No. 3,652,161 and U.S. Pat. No. 3,900,260 is subject to the limitation that different aging and hence different drifting phenomena take place in the two different channels. Such aging and drifting phenomena may adversely influence the precision of the resulting measurements.

Prior art devices also leave room for improvement with regard to the resolution or degree of accuracy in the measurement especially as selecting substantially any desired degree of resolution is concerned.

OBJECTS OF THE INVENTION

In view of the above it is the aim of the invention to achieve the following objects singly or in combination:

to avoid the use of two separate channels for the processing of the reference beam and the processing of the reflected beam so that both respective signals are subject to the same conditions;

to increase the measuring accuracy and to reduce parasitic effects or any other defects that would tend to disturb the accuracy of the measuring;

to make the degree of accuracy selectable by the simple expedient of frequency multiplication;

to avoid the use of an analog reference value by employing a dynamic memory which will continuously and repeatedly provide a digital reference value to increase the resolution of the measurements;

to reduce the high accuracy which had to be satisfied in prior art devices by the frequency generators so that less expensive oscillators may be used while still improving the accuracy and resolution of the measurements;

to minimize the number of components required in this type of circuitry especially to avoid the use of a third oscillator and to reduce the accuracy of the remaining two oscillators in accordance with the ratio between the input frequency and the output frequency of a remaining single mixing stage; and to provide a method for measuring distances with high accuracy or resolution by employing a digital time raster rather than an analog time reference and by processing both signals which represent the reference beam and the reflected beam through a single measuring channel.

SUMMARY OF THE INVENTION

According to the invention there is provided a method for the opto-electronical measuring of a distance between a measuring point and a target, wherein a digital time raster is formed under the control of the lower frequency of the two quartz signal generators. The timing scale of the time raster corresponds to the period of the difference frequency between the two input signals to a mixing stage whereby the time raster is adapted in an optimal manner to the measuring time and to the respective measuring accuracy, and to process both signals representing the reference beam and the reflected beam in one and the same signal processing channel.

In the circuit according to the invention a dynamic memory is provided in the form of a digital counter which is stepped by one of the two signals provided by the two frequency signal generators. The counter constituting the dynamic memory is started by the positive going flank of the difference signal at the output of a mixing stage which flank occurs when the light scanner is receiving the reference light beam. The dynamic memory automatically repeats the generated time raster signal as will be described in more detail below.

More specifically, the present apparatus comprises means providing a reference light beam and a target providing a reflected light beam. The electrical signals representing these light beams are processed through a single measuring channel including a single electro-optical detector optically connected to a light scanner movable between two positions to receive one or the other light beam. Sequence control means are operatively connected to the electro-optical detector means for sequentially detecting the reference light beam or the reflected light beam for processing through the single measuring channel. A dynamic memory is operatively connected to the sequence control means and to the single measuring channel for providing a continuously repeated digital reference phase. Start-stop counting means are operatively connected to the sequency control means, to the single measuring channel, and to the dynamic memory for counting pulses in accordance with said digitally represented reference phase.

BRIEF FIGURE DESCRIPTION

In order that the invention may be clearly understood, it will now be described, by way of example, with reference to the accompanying drawings, wherein:

FIGS. 1a and 1b show a block circuit diagram of the present invention;

FIGS. 2a, 2b, and 2c illustrate, also in block form, further details of the circuit arrangement of FIGS. 1a, 1b;

FIG. 3 illustrates further circuit details of a portion of the sequence control means also shown generally in FIGS. 1b and 2a;

FIG. 5 is an impulse time diagram for the entire circuit, whereby the capital letters in the circles shown in FIG. 5 relate to the same capital letters shown in the other figures to designate the location in the circuit arrangement where the respective pulses occur.

DETAILED DESCRIPTION OF PREFERRED EXAMPLE EMBODIMENTS AND OF THE BEST MODE OF THE PRESENT INVENTION

Figure 1A:
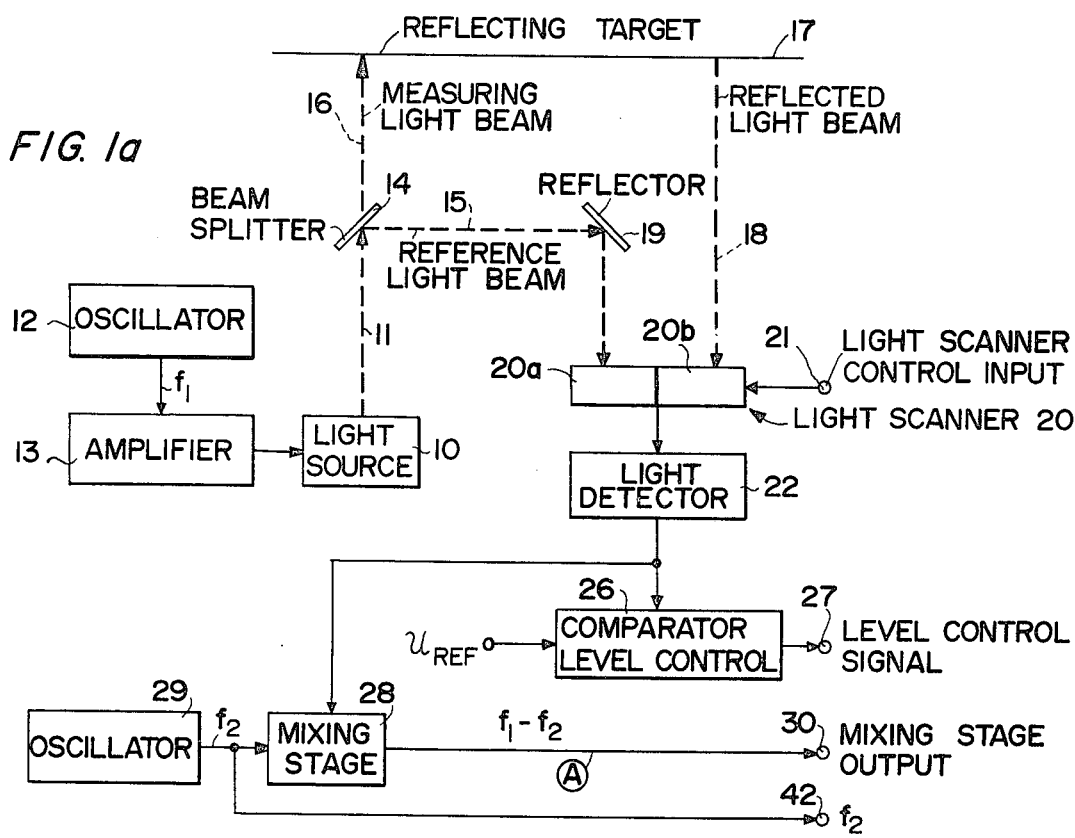
Figure 1B:
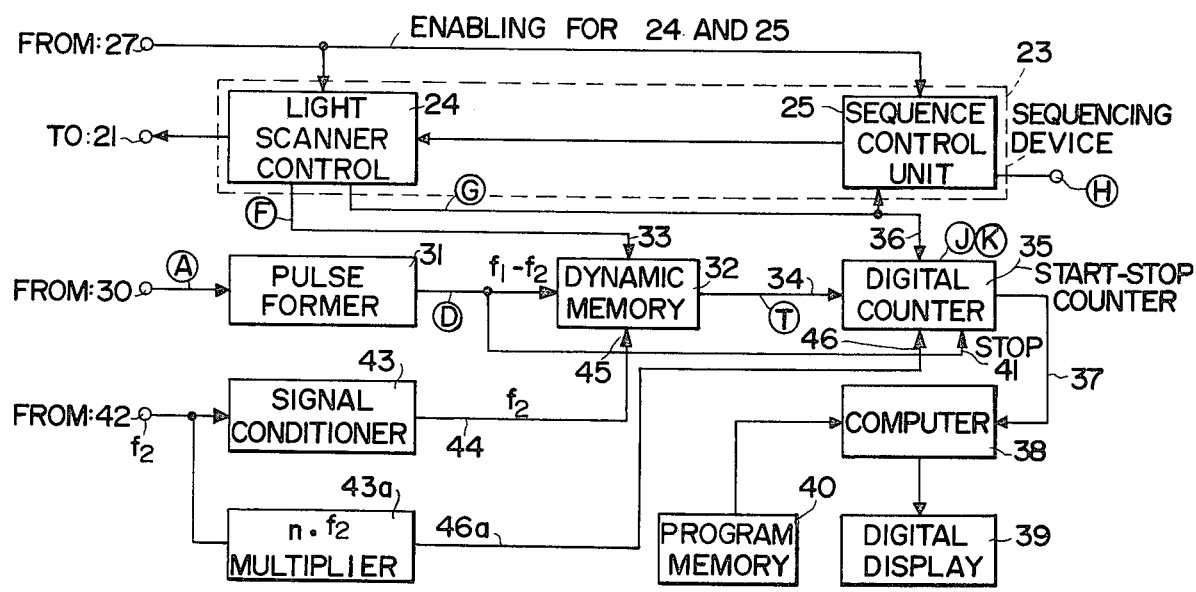

FIGS. 1a and 1b illustrate a block diagram of the circuit according to the invention wherein a light source 10 such as a luminescent light emitting diode produces a light beam 11 which is modulated by a first signal having a first frequency $f_1$. The first signal $f_1$ is generated by an oscillator 12, for example, a quartz controlled oscillator and is amplified in an amplifier 13 for modulating the light beam 11.

A beam splitter 14 divides the modulated light beam 11 into a reference light beam 15 and a measuring light beam 16 which is reflected by a retro-reflecting target 17 to provide a reflected light beam 18. The beam splitter could be, for example, a mirror which partially reflects the light and partially passes the light. A reflector 19 directs the reference beam 15 onto a light scanner 20 having a control input 21. The light scanner 20 may take up at any one time one of two positions 20a and 20b. In position 20a the reference light beam 15 is directed onto a light detector 22 comprising, for example, a light sensitive diode. When the scanner 20 is in the position 20b the reflected light beam 18 from the target is transmitted to the light detector 22. The light scanner 20 may, for example, be a mirror galvanometer having a mirror, the positions of which may be controlled by a signal applied to the control input 21 and supplied by sequencing means 23 comprising a light scanner control 24 and a sequence control unit 25.

The light scanner 20 may comprise, in the alternative, optical crystals, the polarization plane of which may be rotated by a control signal applied to the input 21 from the light scanner control 24 the output of which is also provided with the reference number 21 so as to indicate which terminals are connected together to form the cooperating circuit arrangement of FIGS. 1a and 1b. In any event, the output signal from the light scanner control 24 either rotates the mirror of a mirror galvanometer or it rotates the polarization plane of optical crystals for transmitting either the reference beam 15 or the reflected beam 18 to the light detector 22.

The output of the light detector 22 is connected to one input of a comparator or level control circuit 26, the other input of which is connected to a reference voltage $U_{ref}$. A level control signal appears at the output 27 of the comparator 26 when the signal from the light detector 22 exceeds the reference voltage $U_{ref}$ which may be adjustable. The level control signal is supplied as an enabling signal to the corresponding terminal 27 in FIG. 1b for the light scanner control 24 and the sequence control unit 25.

The output of the light detector 22 is connected to one input of a mixing stage 28, the other input of which is connected to a second oscillator 29 providing a second signal having a frequency $f_2$. The difference or beat frequency signal $f_1-f_2$ is suppled to the mixing stage output terminal 30 which is connected to the respective input terminal of a pulse forming circuit 31 which in turn is connected to the dynamic memory 32 according to the invention. The dynamic memory 32 has an enabling input 33 connected to the light scanner control 24 and an output 34 connected to a digital counter 35. The counter 35 also has an enabling input 36 connected to the light scanner control 24. The output 37 of the digital counter 35 is connected to a computer 38 which in turn supplies a digital display 39 with the range representing signal for a direct, digital read out.

The output of the pulse former 31 is also connected to a stop input 41 of the digital counter 35 as will be described in more detail below. The output 42 of the second oscillator 29 which may also be a quartz controlled oscillator, is connected to a signal conditioner 43 and a frequency multiplier 43 having an output 44 connected to the clocked or counting input 45 of the dynamic memory 32. The output 46a of the $n \cdot f_2$-multiplier 43a is connected to the counting input 46 of the digital counter 35. Referring to the time pulse diagram of FIG. 5 and to FIGS. 1a and 1b the respective letters designate the pulse forms appearing at the respective locations in the circuit diagram. Thus, the A-signal appears at the output 30 of the mixing stage 28 in the form of a sine wave. When the reference beam 15 is being received as shown in the left part of FIG. 5, the A-signal is phase locked with the reference beam 15. When the reflected beam 18 is being received as shown in the right part of FIG. 5, the A-signal is phase locked with the reflected beam.

The D-signal appears in the form of a square wave at the output of the pulse former 31 and has the same phase conditions as the A-signal. The F-signal appears at one output of the light scanner control 24 and signifies that the position 20a of the light scanner 20 is effective to receive the reference light beams 15. The G-signal appears at another output of the light scanner control 24 and signifies that the position 20b of the light scanner 20 is effective to transmit the reflected light beam 18 to the light detector 22. The null phase or time raster signal T appears at the output 34 of the dynamic memory 32, in response to the first positive going passage through zero of the D-signal following the receipt of the reference light beam. Thereafter, the T-signal is phase locked to the phase of the reference light beam. The J-signal is used within the digital counter 35 as will be explained in more detail with reference to FIG. 2c. The same applies with reference to the K-signal. The H-or reset signal appears at an output of the sequence control unit 25 and is applied throughout the entire circuit arrangement as best seen in FIGS. 2a, 2b, and 2c.

Figure 2A:
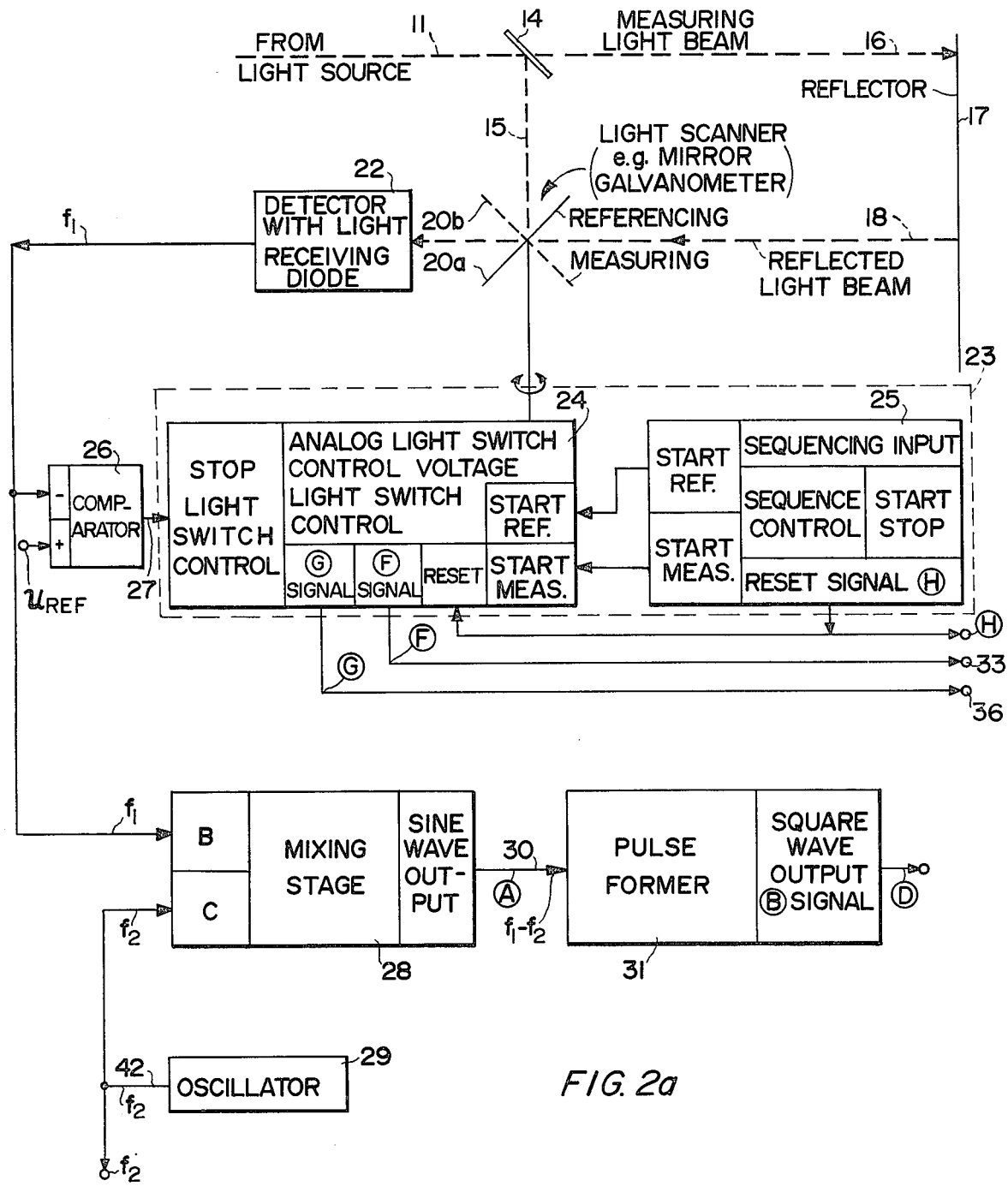
Figure 2B:
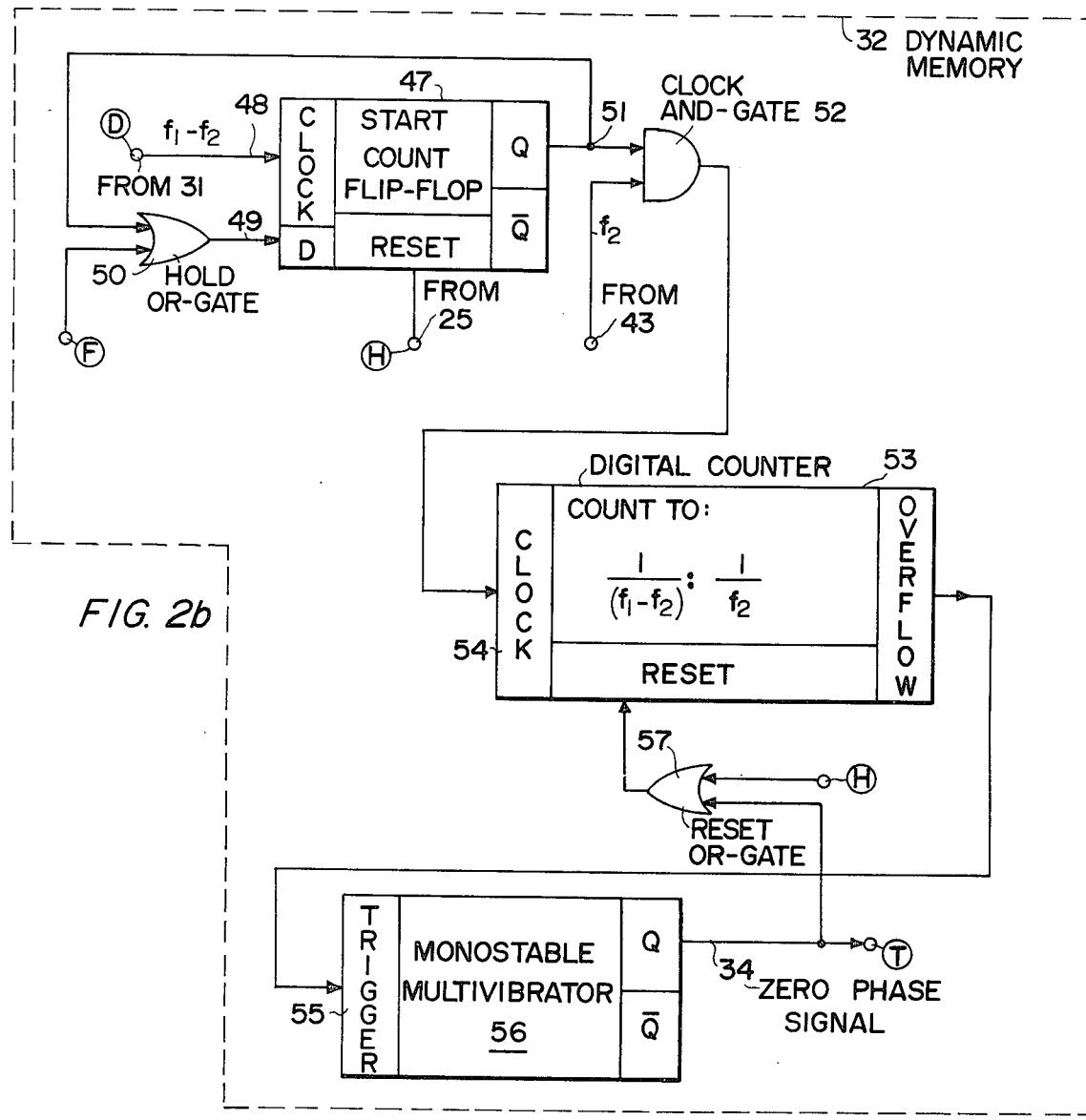
Figure 2C:
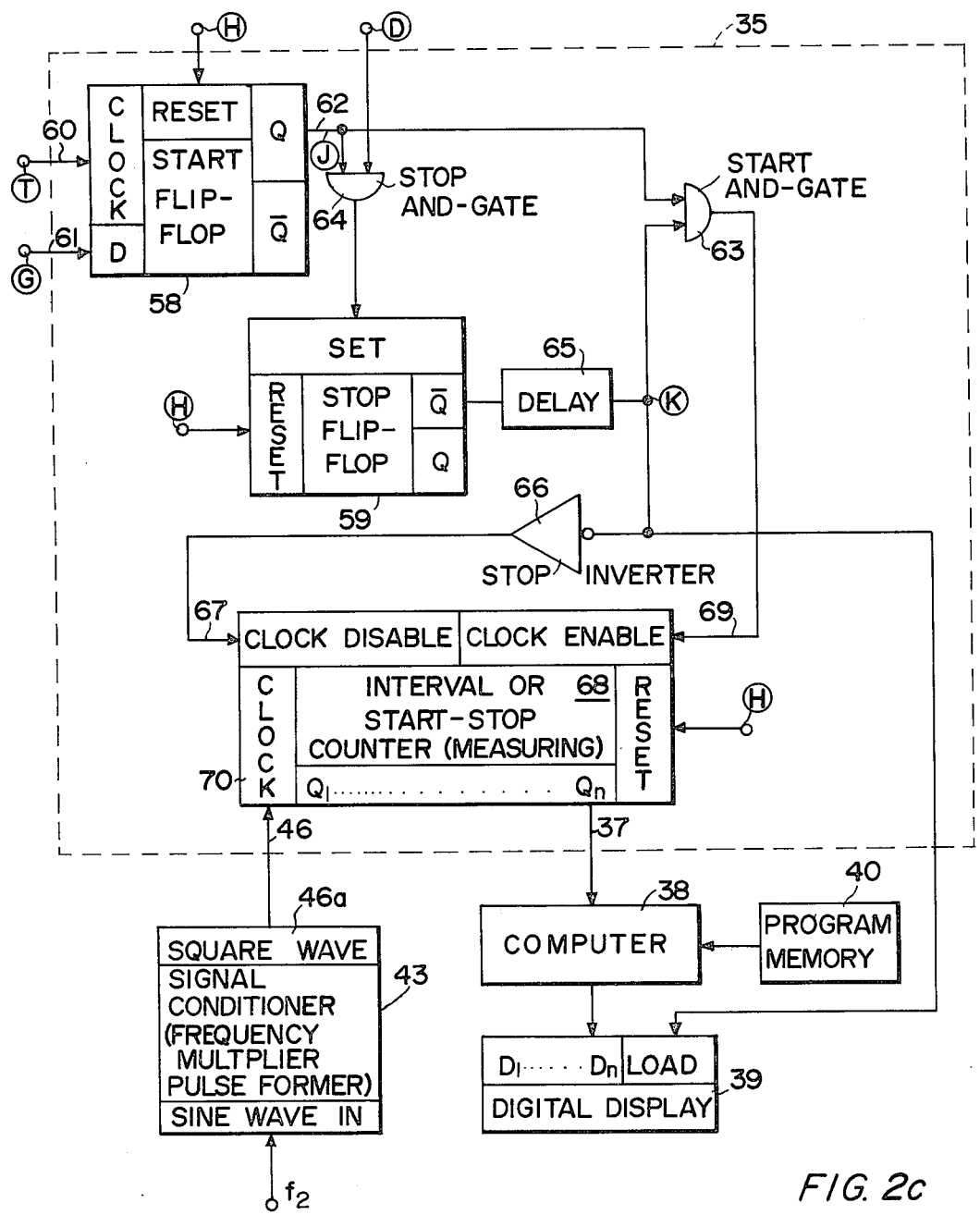

In FIGS. 2a, 2b, and 2c the same items are provided with the same reference numbers and the various signals are also indicated at the positions where they occur. In addition, the labelling in these figures is self explanatory.

FIG. 2b illustrates in further detail the components of the dynamic memory 32. A start counter flip-flop 47 receives at its clock input 48 the D-signal from the output of the pulse former 31. A disable input 49 of the start counter flip-flop 47 is connected to the output of a hold OR-gate 50 which receives at one of its inputs the F-signal and the other input of which is connected to the output 51 of the start counter flip-flop 47. The output 51 of the start counter flip-flop 47 is connected to a clock AND-gate 52 the other input of which is connected to the output of the signal conditioner 43 which provides at its output 44 a square wave. The dynamic memory 32 according to the invention is a digital counter 53 connected with its counting or clock input 54 to the output of the clock AND-gate 52. The digital counter 53 is constructed to count the quotient $$\frac{1}{(f_1 - f_2)} \div \frac{1}{f_2}$$

and to provide an overflow signal supplied to the trigger input 55 of a monostable multivibrator 56 at the output of which the zero phase or time raster T-signal appears. The output 34 or rather the time raster signal T is supplied to one input of an OR-gate 57 the other input of which receives the reset signal H for resetting the digital counter 53. The arrangement of FIG. 2b or rather of the dynamic memory 32 is such that the time raster signal T is continuously repeated and the count starts with the passing of the respective wave form through zero in the positive direction. Thus, the dynamic memory is always started by the difference signal D at the input 48 of the start counter flip-flop 47, if the reflected beam is received. This occurs by the passing through zero in the positive direction when the light scanner 20 has been rotated to receive the reference beam 15. According to the invention the dynamic memory 32 does not count merely once until the receipt of the T-signal by the digital counter 35 but rather repeatedly in an automatic manner. For this purpose the start counter flip-flop 47 is set subsequently to the receipt of the F-signal, by the next positive going signal flank of the D-signal which in this instance represents the reference path phase. Thus, the clock AND-gate 52 is enabled to pass the square wave signals with the frequency $f_2$ coming from the signal conditioner 43.

FIG. 2c shows the details of the digital counter 35 shown in block form in FIG. 1b. The digital counter comprises an input or start flip-flop 58 and a stop flip-flop 59. The start flip-flop 58 receives at its clock or trigger input 60, the time raster signal T and the G-signal at its data input 61. The reset signal H is supplied to respective inputs of both the start flip-flop 58 and the stop flip-flop 59. The J-signal appears at the output 62 of the start flip-flop 58 and is supplied to one input of each of the start AND-gate 63 and the stop AND-gate 64. The other input of the stop AND-gate 64 receives the D-signal and the other input of the start AND-gate 63 receives the K-signal from a delay line 65. The K-signal is also supplied to a stop inverter 66 and to the clock or counting disable input 67 of the start-stop counter 68. The output of the start AND-gate 63 is connected to the clock or count enabling input 69 of the start-stop or measuring counter 68. The pulses to be counted are received by the measuring counter 68 at its clock input 70 which is connected to the square wave output 46a of the signal conditioner 43 and or frequency multiplier 43a. The count output 37 of the measuring counter 68 is connected to the computer 38 as described above.

Figure 3:
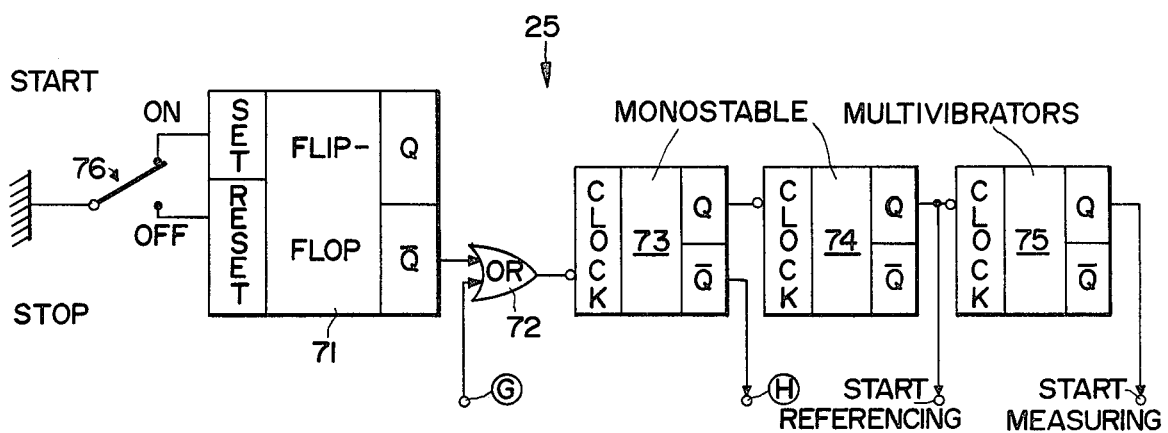

FIG. 3 illustrates the details of the sequence control unit 25 shown in FIG. 1b. The sequence control unit 25 comprises an input flip-flop circuit 71, an OR-gate 72, and three monostable multivibrators 73, 74, and 75. The set and reset inputs of the flip-flop 71 are connected to the on-off switch 76 of the circuit arrangement. The OR-gate 72 receives at one of its inputs the G-signal and its other input is connected to an output of the flip-flop 71. The output of the OR-gate 72 is connected to the clock or counting input of the monostable vibrator 73. These vibrators are connected in series. One output of the monstable vibrator 73 provides the H-or reset signal. The output of the monostable vibrator 74 provides the start signal for receiving the reference beam 15 through the light scanner 20. The output of the monostable multivibrator 75 provides the start signal for receiving the reflected beam 18 through the light scanner.

Figure 4:
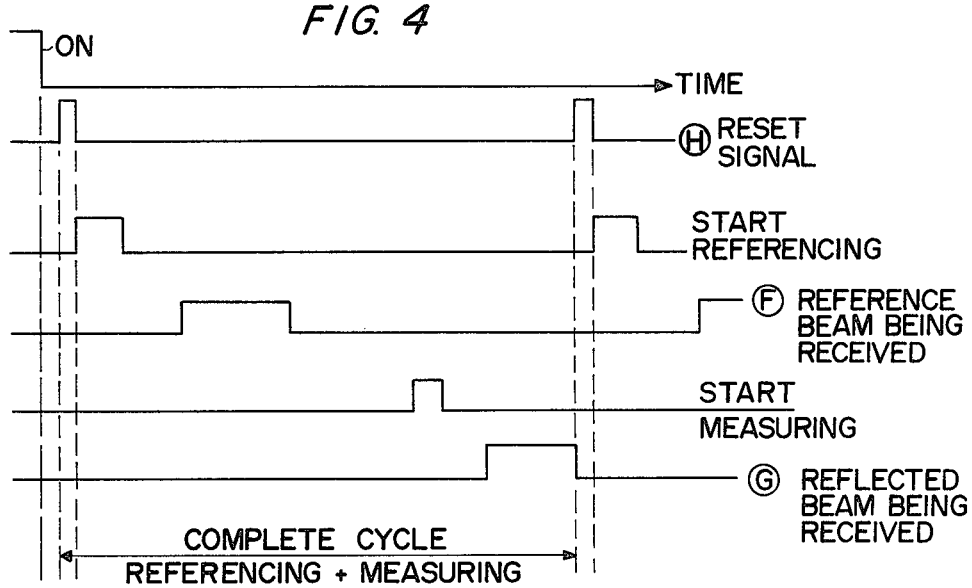
FIG. 4 is a timing diagram for the circuit arrangement of FIG. 3.

The flip-flop 71 quells any transient that might be caused by the switch 76. The monostable multivibrator 73 provides, as mentioned, the reset signal H having a duration of about two micro seconds for resetting all flip-flops and all counters of the entire circuit arrangement. The F-signal is produced as soon after the start referencing signal as the received signal representing the reference beam exceeds the reference signal $U_{ref}$ connected to one input of the comparator circuit 26. The start referencing signal has a duration of about 1 milli-second. To make sure that a zero crossing is sensed, the duration of the F-signal must be slightly longer than one period of the difference frequency signal $f_1-f_2$. The start signal at the output of the multivibrator 75 has a duration of about 1 m/sec. Here again the G-signal signifying the receipt of the reflected beam 18 is generated as soon as the received signal amplitude exceeds the reference voltage at the comparator 26. The trailing edge of the G-signal triggers through the OR-gate 72, the monostable multivibrator 73 to thereby start the next measuring cycle. In the light of the foregoing FIG. 4 is self explanatory.

According to the invention the following elements form a single light signal processing channel, namely, the light scanner 20, the light detector 22, the comparator 26, the mixing stage 28, the pulse former 31, the dynamic memory 32, and the digital counter 35. This feature of the invention has the important advantage that the reference signal derived from the reference beam 15 and the measured signal derived from the reflected light beam 18 are subject to exactly the same processing conditions.

By continuously repeating the reference phase as described above a dynamic memory is established in the digital counter 53 rather than a static memory as in the prior art where the reference point is ascertained but once. The digital counter 53 counts the pulses of the frequency $f_2$, for example, to 10,000 to then produce an overflow for resetting the counter 53. The resetting is accomplished in a time shorter than the period of $f_2$ to eliminate time errors and to provide an exact dynamic zero phase reference which is continuously repeated to thereby constitute a dynamic memory.

Another advantage of the invention is seen in its high accuracy which may simply be achieved by frequency multiplication in the signal conditioner circuit 43a. For example, if the maximum measured range is 100 m and the measuring error shall not exceed 1 mm, and if the period of $f_2$ is, for example, 1 cm, the frequency $f_2$ would be multiplied by a factor of 10 so that the clock frequency at the input 70 of the start-stop or measuring counter 68 would be $10 \cdot f_2$ and the period of this multiplied frequency would correspond to the distance of 1 mm which means that the resolution for a 100 m distance to be measured is 1 mm.

In the light of the foregoing it will be appreciated that the measuring range that may be handled by a circuit arrangment according to the invention is solely limited by the period duration $f_1-f_2$. The producing of the overflow in the digital counter 53 of the dynamic memory 32 must be adapted to the period duration of the difference frequency of $f_1-f_2$. For the above mentioned measuring range of 100 m and a resolution of 1 mm the frequency $f_1$ could, for example, be $f_1=1.5$ MHz and $f_2$ would be $f_2=1.5$ MHz–15 Hz. In this example a frequency multiplication in the circuit 43a would not be necessary. However, if $f_2$ is "$f_2=1.5$ MHz–150 Hz" the frequency multiplication factor would be 10 and the pulse count between the start and stop in the digital counter 53 would be $n \cdot f_2$ whereby n is the frequency multiplication factor.

Incidentally, the computer 38 could provide for a decimal point shift for displaying different ranges measured. The computer could produce a mean or average value from a plurality of values in accordance with a respective program stored in the memory 40.

By continuously repeating the phase which is present when the reference beam is received a highly accurate system is achieved in which the accuracy of the oscillators 12 and 29 may be substantially less, for example, than in U.S. Pat. No. 3,900,260. The just mentioned U.S. Patent requires an accuracy for all three oscillators in the order of $10^{-13}$ if the resolution is to be in the order of $10^{-4}$. The present invention achieves the same resolution with a frequency accuracy of the oscillators 12 and 29 in the order of about $10^{-9}$.

In operation the H-signal produced by the monostable multivibrator 73 resets all flip-flop and counters in the entire circuit to zero. Thereafter the light scanner control 24 which may be a sawtooth generator begins operating to provide a signal rising in a defined direction, whereby the light scanner 20 is rotated to receive light from the light source 10 through the reference beam 15. The light detector produces a respective signal with an increasing high frequency amplitude and this signal is supplied to the comparator 26 until the increasing high frequency amplitude of the received signal reaches or exceeds the value of the reference voltage $U_{ref}$. At this point the scanner 20 is stopped and the F-signal is produced.

The F-signal which, as mentioned, signifies that the reference path is being scanned, prepares the time raster counter 53 in the dynamic memory 32 in such a manner that the counter 53 starts counting in response to the positive zero passage of the sine wave of the difference signal $f_1-f_2$. The time raster counter 53 now counts in correspondence with the difference signal $f_1-f_2$ when the scanner 20 is receiving the reference beam. This means that each positive flank or edge of the signals from the counter 53 is exactly correlated with each positive zero passage of the difference signal $(f_1-f_2)$. When the trailing edge of the F-signal reverses the polarity direction of the light scanner control 24 which drives the light scanner 20, the light received by the detector 24 diminishes until it becomes zero. The received signal only increases again when the light is received from the reflected beam 18. The scanner 20 is now driven in this opposite direction until the signal received by the comparator is again equal to or exceeds the reference voltage $U_{ref}$. Thus, both the reference signal and the measured signal are exactly alike. The scanner 20 is then stopped and the G-signal is produced which signifies that the reflected light beam is being received.

The G-signal prepares the start of the time measurement by the interval or start-stop counter 68 shown in FIG. 2c. The first positive going edge or signal flank, following the appearance of the G-signal, of the previously started time raster signal T starts the interval counter 68. Thus, the start of the interval counter 68 is exactly correlated with the difference signal which represents the zero phase. The time interval counter 68 is now repeatedly triggered until the phase shifted positive zero passage of the difference signal stops the counter 68. The trailing edge of the G-signal, as mentioned, produces the H-signal and the just described sequence is repeated.

Summarizing the foregoing, the D- and F-signals provide the starting condition for the counter 53 of the dynamic memory 32. The G- and T-signals provide the starting condition for the interval or start stop counter 68. The D-signal provides the stop condition for the counter 68 if the measuring light-beam is received. The digital counter 53 of the dynamic memory 32 stops automatically upon reaching a predetermined overflow condition.

Although the invention has been described with reference to specific example embodiments, it will be appreciated, that it is intended to cover all modifications and equivalents within the scope of the appended claims.

What is claimed is:

1. A method for opto-electronically measuring the distance between a measuring point and a reflecting target, comprising the following steps:
   (a) producing a fixed frequency signal having a given fixed frequency,
   (b) modulating the light of a light source with said fixed frequency signal to produce a modulated light beam,
   (c) dividing the modulated light beam into a reference light beam and into a measuring light beam, both beams having said fixed frequency modulated thereon,
   (d) processing, during a first portion of a complete measuring sequence, said reference light beam through receiver means for producing a first electrical signal representing the reference phase of said reference light beam,
   (e) repeatedly producing, in response to said first electrical signal a time raster signal which is phase locked with said reference phase of the first electrical signal even after the reference light beam is not received any more,
   (f) processing, during a second portion of said complete measuring sequence, said measuring light beam after reflection from said target through said receiver means, which are the same receiver means which processed said reference light beam in the first portion of the measuring sequence, for producing a second electrical signal representing the phase shift of said reflected, measuring light beam relative to said reference phase, said phase shift representing the distance to be measured, and
   (g) measuring in said second portion of said complete measuring sequence said phase shift of said reflected, measuring light beam, whereby said phase shift measuring begins in response to said time raster signal and is terminated in response to said phase shifted second electrical signal.

2. The method of claim 1, wherein producing said time raster signal comprises generating a further fixed frequency signal, mixing said first electrical signal with said further fixed frequency signal during said first portion of said complete measuring sequence for producing a first difference frequency signal which is phase locked with said reference phase, and starting the generation of said time raster signal in response to a positive zero passage of said first difference frequency signal, and wherein said second, phase shifted electrical signal is further processed by mixing said further fixed frequency signal with said second phase shifted electrical signal during the second portion of said complete measuring sequence for producing a second difference frequency signal which is phase locked to the shifted phase of the reflected light beam, and stopping said measuring of said shifted phase when said phase shifted second difference frequency signal has a positive zero passage.

3. The method of claim 2, comprising the further steps of:
   (a) producing a first indication signal (signal F) for indicating that said receiver means receive the maximum intensity of the reference light beam,
   (b) producing a second indication signal (signal G) for indicating that said receiver means receive the maximum intensity of the measuring light beam, and
   (c) starting the generation of said time raster signal in response to the first positive zero passage of said first difference frequency signal following the beginning of said first indication signal and stopping said measuring of said phase shift when said phase shifted second difference frequency signal has a first positive zero passage following the beginning of said second indication signal.

4. An apparatus for opto-electronically measuring the distance between a measuring point and a reflecting target, comprising:
   (a) a first fixed frequency signal generator for producing a first signal having a fixed frequency,
   (b) a light source and modulating means operatively connecting said fixed frequency signal generator to said light source for producing a light beam modulating by said first fixed frequency signal,
   (c) light beam splitting means arranged to receive said modulated light beam for splitting the modulated light beam into a reference light beam and into a measuring light beam, whereby both light beams have the fixed frequency modulated thereon,
   (d) light beam receiver and processing means arranged to alternately receive said reference light beam during a first portion of a complete measuring sequence and to receive said measuring light beam as reflected by said target, during a second portion of said complete measuring sequence, said light beam receiver means processing said reference light beam during said first portion for producing a first electrical signal representing the reference phase of said reference light beam, said light beam receiver means processing said reflected measuring light beam during said second portion for producing a second electrical signal representing the phase shift of said reflected, measuring light beam relative to said reference phase,
   (e) time raster signal producing means operatively connected to said receiver means for repeatedly producing in response to said first electrical signal, a time raster signal which is phase locked with said reference phase of said first electrical signal even after the reference light beam is not received any more,
   (f) a second fixed frequency generator for producing a second fixed frequency signal, mixing circuit means connected to receive said second fixed frequency signal and said second electrical signal for producing a phase shifted difference frequency signal, and
   (g) phase shift measuring means operatively connected to receive said time raster signal and said phase shifted difference frequency signal for measuring in said second portion of said complete measuring sequence the phase shift of the reflected measuring light beam, whereby said phase shift measuring begins in response to said time raster signal and is terminated in response to said phase shifted difference frequency signal.

5. The apparatus of claim 4, wherein said light beam receiver and processing means comprise single light scanning means, single light detector means arranged to alternately receive the reference light beam and the reflected measuring light beam, comparator means operatively connected to said light detector means and to a reference value to provide a control signal of equal value in response to the reflected measuring light beam and in response to the reference light beam.

6. The apparatus of claim 5, wherein said light beam receiver and processing means comprise sequence control means including light scanner means and sequencing means both operatively connected to said comparator means for receiving respective enabling signals.

7. The apparatus of claim 5, wherein said time raster signal producing means comprise input flip-flop means operatively connected to said mixing circuit means and including hold OR-gate means at one of its inputs, AND-gate means connected to an output of said input flip-flop means, digital counter means operatively connected to said AND-gate means for providing a count to a predetermined value and for providing an overflow signal, and means receiving said overflow signal to produce said time raster signal.

8. The apparatus of claim 5, further comprising start-stop counting means including start flip-flop means receiving said time raster signal and a preparing signal, stop AND-gate means connected to said start flip-flop means, start AND-gate means also connected to said start flip-flop means, said stop AND-gate means receiving a stop signal derived from said mixing circuit means, stop flip-flop means operatively connected to said stop AND-gate, delay means connected between said stop flip-flop means and one input of said start AND-gate means, and interval counter means having a disable input connected through inverter means to said delay means and an enable input connected to said start AND-gate, clock input means operatively connected to receive said second fixed frequency signal, and reset input means connected to receive a reset signal.

* * * * *

UNITED STATES PATENT OFFICE
CERTIFICATE OF CORRECTION

Patent No. 4,297,030　　　　　　　　Dated October 27, 1981

Inventor(s) Hoiko Chaborski

It is certified that error appears in the above-identified patent and that said Letters Patent are hereby corrected as shown below:

Elements (e), (f) and (g) of claim 4 in column 10 should read as follows:

--(e)　a second fixed frequency signal generator for producing a second fixed frequency signal, mixing circuit means connected to receive said second fixed frequency signal and said first electrical signal during said first portion of said complete measuring sequence for producing a first difference frequency signal which is phase locked with said reference phase of said first electrical signal, and to receive said second fixed frequency signal and said second electrical signal during said second portion of said complete measuring sequence for producing a phase shifted second difference frequency signal, and (f)　time raster signal producing means operatively connected to said receiver means for repeatedly producing in response to said first difference frequency signal, a time raster signal which is phase locked with said reference phase of said first electrical signal even after the reference light beam is not received any more, and

UNITED STATES PATENT OFFICE
CERTIFICATE OF CORRECTION

Patent No. 4,297,030     Dated  October 27, 1982

Inventor(s)  Hoiko Chaborski

It is certified that error appears in the above-identified patent and that said Letters Patent are hereby corrected as shown below:

(g) phase shift measuring means operatively connected to receive said time raster signal and said phase shifted second difference frequency signal for measuring in said second portion of said complete measuring sequence the phase shift of the reflected measuring light beam, whereby said phase shift measuring begins in response to said time raster signal and is terminated in response to said phase shifted second difference frequency signal.--.

On the title page, following the Abstract, "8 Claims, 7 Drawing Figures" should read: --8 Claims, 8 Drawing Figures--.

Signed and Sealed this

Thirty-first Day of August 1982

[SEAL]

Attest:

Attesting Officer

GERALD J. MOSSINGHOFF

Commissioner of Patents and Trademarks